(12) United States Patent
Wu et al.

(10) Patent No.: US 12,228,477 B1
(45) Date of Patent: Feb. 18, 2025

(54) METHOD FOR DIAGNOSING ROTOR RUB-IMPACT IN ROTATING MACHINERY BASED ON VIBRATION SIGNAL DECONSTRUCTION AND FREQUENCY MODULATION CHARACTERISTIC ANTI-NOISE ENHANCEMENT

(71) Applicant: ZHEJIANG UNIVERSITY, Zhejiang (CN)

(72) Inventors: Dazhuan Wu, Hangzhou (CN); Yaochun Hou, Hangzhou (CN); Yuxuan Wang, Hangzhou (CN); Peng Wu, Hangzhou (CN); Shuai Yang, Hangzhou (CN); Bin Huang, Hangzhou (CN); Tian Xiang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/830,528

(22) Filed: Sep. 10, 2024

Related U.S. Application Data

(63) Continuation of application No. PCT/CN2023/127503, filed on Oct. 30, 2023.

(51) Int. Cl.
G06F 11/30 (2006.01)
G01M 99/00 (2011.01)

(52) U.S. Cl.
CPC .................. G01M 99/005 (2013.01)

(58) Field of Classification Search
CPC .................................................. G01M 99/005
See application file for complete search history.

(56) References Cited

U.S. PATENT DOCUMENTS

2014/0230555 A1* 8/2014 Cerny ................... F01D 25/164
73/593

FOREIGN PATENT DOCUMENTS

CN 115655706 A 1/2023
CN 116541677 A * 5/2023

OTHER PUBLICATIONS

International Search Report (PCT/CN2023/127503); Date of Mailing: Jul. 2, 2024.
Structural-rotor-rub-impact-diagnosis-under-intricate-noise-interferences-based-on-targeted-component-extraction-and-stochastic-resonance-enhancement.

* cited by examiner

Primary Examiner — Phuong Huynh
(74) Attorney, Agent, or Firm — W&G Law Group

(57) ABSTRACT

A method for diagnosing rotor rub-impact in a rotating machinery based on vibration signal deconstruction and frequency modulation characteristic anti-noise enhancement, including: converting, based on two-stage integration transformation and high-pass filtering, vibratory acceleration signals from a rotating machinery device into vibratory displacement signals; performing targeted extraction on a rotating frequency component therein based on an improved variational mode decomposition method; calculating and estimating instantaneous fluctuation characteristics of a fundamental frequency of the extracted rotating frequency component using a quadrature-derivative-based normalized Hilbert transform to obtain an instantaneous frequency; inputting a calculated instantaneous frequency sequence into an optimum stochastic resonance system for anti-noise enhancement of intrawave frequency modulation characteristics; and processing FFT on an instantaneous frequency of intrawave frequency modulation characteristics after anti-noise enhancement, and diagnosing and identifying a rotor rub-impact fault of the rotating machinery based on a distribution characteristic of harmonic amplitudes related to a rotor rotating frequency.

10 Claims, 5 Drawing Sheets

METHOD FOR DIAGNOSING ROTOR RUB-IMPACT IN ROTATING MACHINERY BASED ON VIBRATION SIGNAL DECONSTRUCTION AND FREQUENCY MODULATION CHARACTERISTIC ANTI-NOISE ENHANCEMENT

CROSS-REFERENCE TO RELATED APPLICATIONS

The present application is a continuation of International Application No. PCT/CN2023/127503, filed on Oct. 30, 2023, the content of which is incorporated herein by reference in its entirety.

TECHNICAL FIELD

The present disclosure belongs to the field of condition monitoring and fault diagnosis of rotating machineries, and particularly relates to a method for diagnosing rotor rub-impact in a rotating machinery based on vibration signal deconstruction and frequency modulation characteristic anti-noise enhancement.

BACKGROUND

The structural rotor is one of the most pivotal components of rotor-system-based rotating machineries, such as wind turbines, rotary compressors, centrifugal pumps, and generator sets, which have occupied a crucial place in numerous modern applications, including mining, metallurgy, energy production, and transportation. Due to the extreme and harsh operating conditions, structural rotors can be subjected to a variety of potential malfunctions, for instance, imbalance, cracking, misalignment, looseness, oil whirl, cocked, and so on. As a frequently occurring failure exhibiting nonlinearities, a rub-impact fault happens when the rotor cyclically strikes the rotor system's stator, the cause of which usually can be the initial subtle imbalance and faint misalignment of the rotor, especially when the shaft is at a tremendously high rotational speed and the radial clearance between the stator and the rotor is considerably faint, the rub-impact fault of the rotor is very likely to occur. As a matter of fact, with the higher requirements and more stringent specifications of assembly precision, today's machine structure of most power equipment has become relatively more sophisticated and more compact, parts of which operates under extremely diminutive clearance, making the occurring probability of rub-impact in the rotor system increase more impressively. Once the rub-impact fault occurs, it can induce the rotor system dynamic instability and attenuate the operating accuracy of a machine to a large extent, and provoke prejudicial impacts on the concerned power equipment's structural attributes and performance as well as bring about extra defects to the parts associated with it, like bearings and impellers, which will eventually result in system-wide catastrophic failures. Therefore, it is of extremely important practical engineering significance to perform condition monitoring and fault diagnosis on rotor systems for detecting the initial occurrence of incipient rub-impact faults, which can effectively promote the equipment prognosis and health management level and guarantee the safe and stable production of industries.

At present, there are generally the following methods for monitoring and diagnostic analysis of the rotor rub-impact fault of the rotating machinery:

(1) Based on a conventional spectrum analysis technology, a rotating frequency, a half frequency, a high-order harmonic frequency and the like corresponding to fault characteristics that may exist in a Fourier spectrum of a collected vibration signal and include synchronous vibration, subsynchronous vibration as well as supersynchronous vibration. However, these frequency characteristic symptoms may also occur when other types of faults occur in the machine, for example, rotor shaft cracking and mechanical looseness, and these characteristic representations are not significant at an early stage of the generation of the rotor rub-impact fault in the rotating machinery, and are difficult to detect in time.

(2) An impact generated by a quasi-periodic contact and separation process between the rotor and the stator in a time-domain signal is observed, methods such as signal deconstruction is generally required to effectively separate and extract the component, which mainly includes empirical mode decomposition, blind source separation, empirical wavelet transform, etc. However, when other parts of the rotating machinery fail, similar fault symptoms may also be generated, such as gear defects and partial damage of the rolling bearing, and different noise distribution forms and noise degrees also tend to affect the effectiveness and availability of a signal deconstruction result.

(3) An intelligent method based on data driving mainly includes a set of end-to-end flow as "data pre-processing-characteristic extraction-characteristic selection/dimension reduction-characteristic learning-diagnosis output", and the mainstream methods involved include a support vector machine, a random forest, a deep belief network, a convolutional neural network, etc. However, on the one hand, these methods usually require training and learning through a large number of identically-distributed high-quality data samples with labels, and are difficult to meet in a practical condition; and on the other hand, opacity and unexplainability of those deep intelligent diagnosis models make them "black boxes", and the diagnosis conclusion output thereby is difficult to be fully trusted in practical applications.

(4) A rotor rub-impact fault diagnosis technology of the rotating machinery based on nonlinear random kinetic behaviour analysis mainly includes a Volterra series identification and nonlinear output frequency response function estimation method, and the like. However, such method is generally relatively complex in calculation, and a certain amount of calculation and analysis time is required to obtain a reliable diagnosis result of the rotor rub-impact fault, which is generally difficult to satisfy the timeliness of implementing on-line monitoring and diagnosis in practical engineering applications.

(5) A method such as a rotor rub-impact diagnosis technology based on vibration signal amplitude modulation and frequency modulation characteristic extraction usually involves time-frequency domain analysis of the signal, and mainly includes short-time Fourier transform (STFT), continuous wavelet transform (CWT), Hilbert-Huang transform (HHT), and adaptive chirp mode decomposition (ACMD) and the like. However, such method is generally less robust in the case of noise interference, and tends to face failure when analyzing and processing vibration data with a low signal-to-noise ratio, which greatly limits the practical application of these methods.

It can be seen that the existing various methods for monitoring and diagnosing analysis of the rotor rub-impact fault of the rotating machinery all have their respective defects and deficiencies. Therefore, there is a need to develop an efficient method for the rotor rub-impact diagnosis of the rotating machinery, which can detect the early rotor rub-impact fault of the rotating machinery in a timely manner in a complex environment, can effectively improve the prognosis and health management level of the device, and has extremely important practical engineering significance. In addition, since a displacement signal usually has a high signal-to-noise ratio and can accurately reflect a vibration condition of the rotor, the above method mostly performs diagnosing analysis of a rotor system based on the vibratory displacement signal. However, it should be noted that although a displacement sensor has advantages such as a large linear range, a zero frequency response, a strong anti-interference capability, and easy calibration, its practical application is not as extensive as an acceleration sensor, and is generally and only applicable to monitoring of the rotor system of a large rotating machinery, and is mainly limited by complex installation requirements, economic considerations, and other factors. Therefore, in some cases, the method for diagnosing rotor rub-impact in the rotating machinery based on the vibratory displacement signal analysis may be difficult to meet practices and cannot be implemented, and thus it is necessary to study and apply more general and universal advanced diagnosis strategies, because the rotor rub-impact fault may occur in various rotating machineries based on the rotor system.

SUMMARY

In order to solve the above problems of the prior art, the present disclosure provides a method for diagnosing rotor rub-impact in a rotating machinery based on vibration signal deconstruction and frequency modulation characteristic anti-noise enhancement, which may diagnose and discriminate a rotor rub-impact fault of a rotating machinery of power equipment under intricate noise interferences based on vibratory acceleration signal analysis.

The objective of the present disclosure is achieved by the following technical solutions:

A method for diagnosing rotor rub-impact in a rotating machinery based on vibration signal deconstruction and frequency modulation characteristic anti-noise enhancement includes:

Step 1: collecting, by a vibration acceleration sensor, a signal sequence from a rotating machinery device.

Step 2: converting, based on two-stage integration transformation and high-pass filtering, a collected vibratory acceleration signal into a vibratory displacement signal.

Step 3: performing targeted extraction on a rotating frequency component in the vibratory displacement signal based on an improved variational mode decomposition method.

Step 4: calculating and estimating instantaneous fluctuation characteristics of a fundamental frequency of the extracted rotating frequency component using a quadrature-derivative-based normalized Hilbert transform to obtain an instantaneous frequency.

Step 5: inputting a calculated instantaneous frequency sequence into an optimum stochastic resonance system for anti-noise enhancement of intrawave frequency modulation characteristics, wherein potential energy parameters of a stochastic resonance system and a step length of a Runge-Kutta calculation process are optimized by a particle swarm optimization algorithm to obtain the optimum stochastic resonance system.

Step 6: processing fast Fourier transform on the instantaneous frequency of the intrawave frequency modulation characteristics after anti-noise enhancement, and diagnosing and identifying a rotor rub-impact fault of the rotating machinery based on a distribution characteristic of harmonic amplitudes related to a rotor rotating frequency.

Compared with the prior art, the present disclosure has the following beneficial effects:

Aiming at defects and deficiencies of the existing rotor rub-impact fault diagnosis and analysis technology of the rotating machinery of the power equipment, the present disclosure provides to take vibratory acceleration signal analysis processing as a main manner, convert the vibratory acceleration signal into the vibratory displacement signal through two-stage integration transformation, perform targeted extraction on the rotating frequency component therein based on a signal deconstruction method, then calculate and estimate an instantaneous frequency of the rotating frequency component, then input the obtained instantaneous frequency sequence into the optimum stochastic resonance system for intrawave modulation characteristic anti-noise enhancement, then process fast Fourier transform on the outputted instantaneous frequency subjected to frequency modulation characteristic enhancement, and finally diagnose and identify the rotor rub-impact fault of the rotating machinery based on the distribution characteristics of the harmonic amplitudes related to the rotor rotating frequency. This method is based on a vibratory acceleration signal processing technology used more widely and commonly, and has excellent robustness to the inevitable intricate noise interferences in the signal collection and signal transformation processing process in industrial environments, making it of significant importance for practical engineering applications.

BRIEF DESCRIPTION OF DRAWINGS

FIG. 8(a) shows time-frequency representation (TFR) of HHT, FIG. 8(b) shows TFR of ACMD, and FIG. 8(c) shows Fourier spectrum of the instantaneous frequency (IF) extracted by ACMD.

DESCRIPTION OF EMBODIMENTS

The present disclosure will be described below in detail with reference to the accompanying drawings and preferred embodiments. The objectives and effects of the present disclosure will become more apparent. It should be understood that the specific embodiments described here are only intended to explain the present disclosure, but not to limit the present disclosure.

The present disclosure is based on vibratory acceleration signal analysis to first convert a vibratory acceleration signal into a vibratory displacement signal through two-stage integration transformation, then perform targeted extraction on a rotating frequency component therein via a signal deconstruction method, then calculate and estimate an instantaneous frequency of the rotating frequency component, then input an obtained instantaneous frequency sequence into an optimum stochastic resonance system for intrawave modulation characteristic anti-noise enhancement, finally perform fast Fourier transform processing on the instantaneous frequency subjected to frequency modulation characteristic enhancement outputted by optimum stochastic resonance, and diagnose and identify a rotor rub-impact fault of a rotating machinery based on distribution characteristics of harmonic amplitudes related to the rotor rotating frequency, thereby providing important technical support for timely monitoring, control, safe and efficient operation and maintenance of the operation condition of the rotor system of the rotating machinery of the power equipment.

Figure 1:
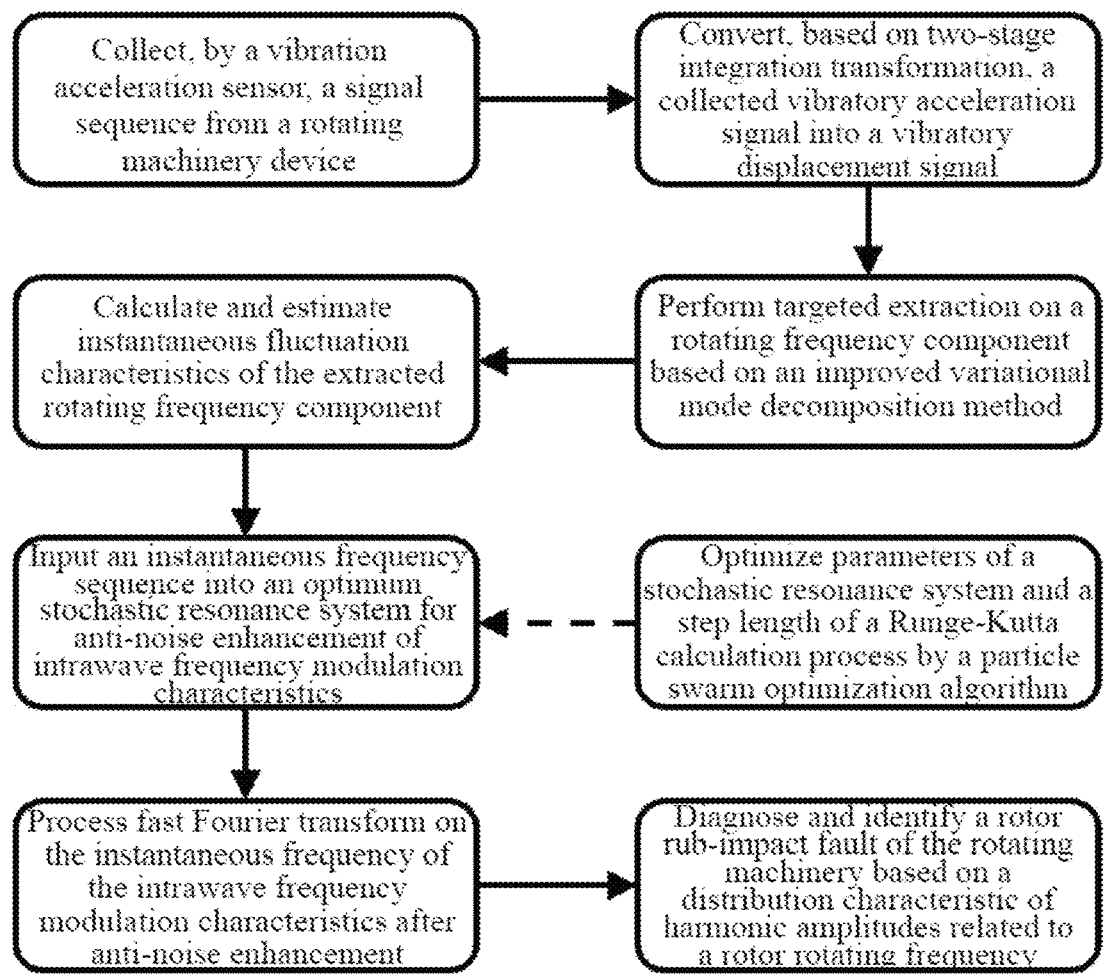
FIG. 1 is a schematic flow diagram of a method for diagnosing rotor rub-impact in a rotating machinery based on vibration signal deconstruction and frequency modulation characteristic anti-noise enhancement of the present disclosure.

As shown in FIG. 1, a method for diagnosing rotor rub-impact in a rotating machinery based on vibration signal deconstruction and frequency modulation characteristic anti-noise enhancement includes the following steps: step 1: collecting, by a vibration acceleration sensor, a signal sequence from a rotating machinery device.

In an example, the vibration acceleration sensor is rigidly connected to the target rotating machinery device to collect a vibration signal sequence for a certain time. The collected vibration signal sequence is transmitted to a data acquisition unit based on wireless communication or wired transmission that complies with the ISO standard protocol. The data acquisition unit converts the vibration signal sequence from an analog signal type to a digital signal type, and then transmits the vibration signal sequence after conversion to the digital signal type to a memory where the main control unit is located through the wireless communication or wired transmission that complies with the ISO standard protocol, thereby completing the data collection process of the vibration acceleration signal sequence.

In step 1, the signal sequence collected from the rotating machinery device through the vibration acceleration sensor is recorded as $S_{a_o}(i)$, $i=1, 2, 3, \ldots, N$, where N is the number of total sampling points, and a sampling frequency is recorded as $f_s$. In a signal collecting process, a frequency response parameter of the used vibration acceleration sensor should be not less than 2 kHz, a sampling frequency of a vibration signal sequence should be not less than 5.12 kHz and not greater than 100 kHz, and a sampling duration should be not less than 1 s.

Step 2: converting, based on two-stage integration transformation and high-pass filtering, a collected vibratory acceleration signal into a vibratory displacement signal:

(2-1) one integration is performed first to convert the vibratory acceleration signal $S_{a_o}$ into a vibratory velocity signal, as follows:

$S_{v_o}(1)=0$, $S_{v_o}(i)=S_{v_o}(i-1)+S_a(i-1)\times \Delta T, i=2,3,\ldots,N+1$, where $\Delta T=1/f_s$, $S_a$ is obtained by filtering a signal $S_{a_o}$ through a high-pass filter. In order to avoid the adverse effect of an extremely low-frequency component in an original vibration signal on a final integral result, a cut-off frequency $W_{BG1}$ of the high-pass filter is generally taken from 10 Hz to 25 Hz so as to obtain a better signal integral result.

(2-2) Then, an extremely low-frequency component of the obtained vibratory velocity signal $S_{a_o}$ is also removed through a high-pass filter, and a cut-off frequency $W_{BG2}$ of the filter is taken from 10 Hz to 25 Hz so as to obtain a filtered signal $S_v$. Then an integration operation is performed on $S_v$ to obtain a final vibratory displacement signal $S_x$:

$S_x(i)=(S_v(1)+S_v(2))/2\times \Delta T$, $S_x(i)=S_x(i-1)+(S_v(i)+S_v(i+1))/2\times \Delta T, i=2,3,\ldots,N$.

In the step 2, a high-pass filter with a stopband attenuation of 60 dB is used to perform zero-phase filtering on the vibratory acceleration signal and the vibratory velocity signal, respectively, and the high-pass filter attenuates a frequency lower than a specified passband frequency, which is able to compensate for a delay introduced by a digital filter.

Step 3: performing targeted extraction on a rotating frequency component in the vibratory displacement signal based on an improved variational mode decomposition. Step 3 includes the following sub-steps:

(3-1) First, a series of intrinsic mode functions $u_k(t)$, $k\in (1, 2, \ldots, K)$, with K being the total number of modes, with respect to the signal $S_x$ are defined as a series of amplitude modulation-frequency modulation signals, which may be expressed as:

$u_k(t)=A_k(t)\cos(\varphi_k(t))$, where $A_k(t)$ and $\varphi_k(t)$ represent an instantaneous amplitude and an instantaneous phase, respectively, and $\varphi_k(t)$ is a nondecreasing function, that is, the instantaneous frequency always satisfies $\omega_k(t)=d[\varphi_k(t)]/dt\geq 0$. Compared with $\varphi_k(t)$, rates of change of $A_k(t)$ and $\omega_k(t)$ are almost extremely slow, so these intrinsic mode functions may be regarded as a series of bandwidth-limited signals, which may be expressed by a calculus of variations as:

$$BW_k = \left\| \partial_t \left[ \left( \delta(t) + \frac{j}{\pi t} \right) * u_k(t) \right] e^{-j\omega_k t} \right\|_2,$$

where $\delta(\cdot)$ is a Dirac function, and $*$ is a convolution manipulator; and $BW_k$ is a norm of a bandwidth of $u_k(t)$ in a frequency domain. So far, a constrained variational problem may be remodeled as:

$$\min_{\{u_k\},\{\omega_k\}} \left\{ \sum_{k=1}^{K} \left\| \partial_t \left[ \left( \delta(t) + \frac{j}{\pi t} \right) * u_k(t) \right] e^{-j\omega_k t} \right\|_2^2 \right\}$$

$$\text{subject to } \sum_{k=1}^{K} u_k(t) = S_x(t),$$

where $\omega_k$ represents a center frequency of K intrinsic mode functions, $k\in (1, 2, \ldots, K)$.

(3-2) A quadratic penalty term and a Lagrangian multiplier term are introduced to address a minimization problem, as follows:

$$L(\{u_k\}, \{\omega_k\}, \lambda) = \alpha \sum_{k=1}^{K} \left\| \partial_t \left[ \left( \delta(t) + \frac{j}{\pi t} \right) * u_k(t) \right] e^{-j\omega_k t} \right\|_2^2 +$$
$$\left\| S_x(t) - \sum_{k=1}^{K} u_k(t) \right\|_2^2 + \left\langle \lambda(t), S_x(t) - \sum_{k=1}^{K} u_k(t) \right\rangle,$$

where $\alpha$ represents a bandwidth balance parameter, and $\lambda(t)$ is a Lagrangian multiplier coefficient. The equation is resolved via an alternate direction Lagrangian multiplier method, so as to obtain K intrinsic mode functions $u_k(t)$, $k \in (1, 2, \ldots, K)$ with respect to the vibratory displacement signal $S_x(t)$.

(3-3) A rotating frequency component in the vibratory displacement signal $S_x$ is extracted based on an improved variational mode decomposition method, that is, before performing the variational mode decomposition and the intrinsic mode function extraction on the signal $S_x$, the mode number K is set to be 1, an initial bandwidth balance parameter $\alpha$ is set to be 5000, an initial central frequency of a mode is set to be a rotating frequency $f_{roc}$, and a target frequency index MTFI is used to evaluate a spectrum definition of a signal deconstruction result, wherein an optimal parameter of a deconstruction algorithm is obtained by performing optimization via forward and reverse alternate iterations.

A calculation formula of the target frequency index MTFI is as follows:

$$MTFI = \frac{F^*(f_{roc})}{\sum_{f_j} F(f_j)},$$
$$F^*(f_{roc}) = \max[F(f_{roc} - 0.02 f_{roc}, f_{roc} + 0.02 f_{roc})],$$

where $F(f_j)$ represents a Fourier spectrum amplitude corresponding to an output signal at a frequency $f_j$; and $F^*(f_{roc})$ represents a maximum frequency amplitude within a range of 22% values around the rotating frequency $f_{roc}$.

Finally, an intrinsic mode function $u_{target}$ corresponding to the maximum MTFI value is the extracted rotating frequency component.

Sub-step (3-3) includes the following sub-sub-steps:

(3-3-1) A vibratory displacement signal $S_x$ is input, an iteration count Iter=0 is initialized, the maximum iteration number MaxIter=500 is set, and a searching step of the bandwidth balance parameter is set to be $\Delta\alpha=500$.

(3-3-2) A primary deconstruction is performed on the vibratory displacement signal $S_x$ by using the variational mode decomposition to obtain an intrinsic mode function $u_0$ and a target frequency index $MTFI_0$.

(3-3-3) Loop is started, Iter=Iter+1 is made, and the bandwidth balance parameter is changed into $\alpha_1 = \alpha_0 + \Delta\alpha$ and $\alpha_2 = \alpha_0 - \Delta\alpha$, respectively; then, two obtained values $\alpha_1$ and $\alpha_2$ of the bandwidth balance parameter are substituted into a variational mode decomposition algorithm, respectively, to perform a deconstruction on the vibratory displacement signal $S_x$, so as to obtain $u_{1,Iter}$ and $u_{2,Iter}$ as well as a corresponding $MTFI_{1,Iter}$ and $MTFI_{2,Iter}$, respectively.

(3-3-4) If $MTFI_0 > MTFI_{1,Iter}$ and $MTFI_0 > MTFI_{2,Iter}$, the loop is broken and a final target rotating frequency-related component $u_{target} = u_0$ is outputted; and if $MTFI_0$ does not satisfy the above condition, $MTFI_0 = \max(MTFI_{1,Iter}, MTFI_{2,Iter})$ and $$\alpha_0 = \underset{\alpha_j, j=1,2}{\operatorname{argmax}}(MTFI_{i,Iter})$$

(3-3-5) If Iter>MaxIter, the loop is broken, a result $u_{target}$ obtained by using a variational mode decomposition method to deconstruct the vibratory displacement signal $S_x$ under the action of the latest bandwidth balance parameter $\alpha_0$ is outputted; else, sub-sub-step (3-3-3) is performed.

(3-3-6) The loop is ended and a final target rotating frequency component $u_{target}$ is outputted.

In the sub-sub-steps (3-3-2), (3-3-3) and (3-3-5), using the variational mode decomposition method to deconstruct the vibratory displacement signal $S_x$ includes the following sub-steps:

(i) The Fourier transform of $u_k(t)$, $f(t)$ and $\lambda(t)$ are set as $\hat{u}_k(\omega)$, $\hat{f}(\omega)$ and $\hat{\lambda}(\omega)$, respectively. $\{\hat{u}_k^1\}$, $\{\omega_k^1\}$ and $\hat{\lambda}^1$ are initialized, and iteratively counting n=0 is performed.

(ii) Iteratively counting n=n+1 is performed.

(iii) For k=1, 2, ..., K, all $\alpha_k$ are updated one by one, expressed as follows:

$$\hat{u}_k^{n+1}(\omega) \leftarrow \frac{\hat{f}(\omega) - \sum_{i<k} \hat{u}_i^{n+1}(\omega) - \sum_{i>k} \hat{u}_i^n(\omega) + \hat{\lambda}^n(\omega)/2}{1 + 2\alpha(\omega - \omega_k^n)^2}.$$

$\omega_k$ is updated simultaneously:

$$\omega_k^{n+1} \leftarrow \frac{\int_0^\infty \omega |\hat{u}_k^{n+1}(\omega)|^2 d\omega}{\int_0^\infty |\hat{u}_k^{n+1}(\omega)|^2 d\omega}.$$

(iv) $\hat{\lambda}(\omega)$ is updated:

$$\hat{\lambda}^{n+1}(\omega) \leftarrow \hat{\lambda}^n(\omega) + \tau(\hat{f}(\omega) - \Sigma_k \hat{u}_k^{n+1}(\omega)),$$

where $\tau$ is a noise tolerance coefficient, in order to avoid the influence of strong noise on a signal deconstruction result, and completely reconstructing a signal is not the final objective of the present disclosure, and therefore the noise tolerance coefficient is taken as $\tau=0$ to regulate and control the influence of the noise on a reconstruction process.

(v) The sub-steps (ii)-(iv) are repeated until an ending condition is satisfied:

$$\Sigma_k \|\hat{u}_k^{n+1} - \hat{u}_k^n\|_2^2 / \|\hat{u}_k^n\|_2^2 < \varepsilon$$

where $\varepsilon$ represents a convergence coefficient, and $\varepsilon = 1 \times 10^{-6}$.

Step 4: calculating and estimating instantaneous fluctuation characteristics of a fundamental frequency of the extracted rotating frequency component using a quadrature-derivative-based normalized Hilbert transform to obtain an instantaneous frequency. Step 4 includes the following sub-steps:

(4-1) For a monocomponent amplitude modulation-frequency modulation signal $g(t)$, all maximum extreme values in an absolute form are searched if the amplitude of the signal is not normalized, and then cubic spline function fitting is performed on these extreme values to obtain an empirical envelope function $B_0(t)$.

(4-2) Amplitude normalization is performed on the signal g(t), namely:

$$g_1(t)=g(t)/B_0(t).$$

Sub-step (4-1) is performed if the amplitude of $g_1(t)$ is still not completely normalized, until difference between the amplitude of the L empirical envelope function and 1 is smaller than $10^{-5}$, and the obtained output signal $g_{L+1}(t)$ at this time is regarded as a pure frequency modulation signal.

(4-3) An instantaneous amplitude signal $B(t)=B_0(t)\cdot B_1(t)\cdot \ldots \cdot B_L(t)$ of the signal g(t) is calculated, and a frequency modulation signal F(t) of g(t) is recalculated:

$$F(t)=g(t)/B(t).$$

(4-4) $Q(t)=\pm\sqrt{1-F^2(t)}$ is set, so that an instantaneous phase $\phi(t)$ is estimated as:

$$\phi(t)=\arctan[Q(t)/F(t)]$$

Based on the instantaneous phase $\phi(t)$, an instantaneous frequency $\omega(t)$ is then calculated and estimated as:

$$\omega(t) = \frac{|d\phi(t)/dt|}{2\pi}.$$

where $\omega(t)>0$ is always satisfied.

Step 5: inputting a calculated instantaneous frequency sequence into an optimum stochastic resonance system for anti-noise enhancement of intrawave frequency modulation characteristics, wherein potential energy parameters of a stochastic resonance system and a step length of a Runge-Kutta calculation process are optimized by a particle swarm optimization algorithm to obtain the optimum stochastic resonance system.

Step 5 includes the following sub-steps:

(5-1) A stochastic resonance system is constructed as follows:

$$\frac{dx}{dt} = -\frac{dU(x)}{dx} + S(t) + N(t),$$

where x represents a motion trajectory of a particle, S(t) represents a tenuous periodic signal, N(t) represents Gaussian white noise, and U(x) represents a potential function.

(5-2) A reflection-symmetric quartic potential function is used as U(x):

$$U(x) = -\frac{1}{2}ax^2 + \frac{1}{4}bx^4,$$

where a and b represent positive parameters controlling a potential barrier and a potential well of the reflection-symmetric quartic potential function U(x), respectively.

The stochastic resonance system is derived as:

$$\frac{dx}{dt} = ax - bx^3 + S(t) + N(t).$$

(5-3) The stochastic resonance system is resolved based on a fourth-order Runge-Kutta approach to obtain:

$$k_1=ax(i)-bx(i)^3+S(i)+N(i)$$

$$k_2=a(x(i)+hk_1/2)-b(x(i)+hk_1/2)^3+S(i)+N(i)$$

$$k_3=a(x(i)+hk_2/2)-b(x(i)+hk_2/2)^3+S(i+1)+N(i+1)$$

$$k_4=a(x(i)+hk_3)-b(x(i)+hk_3)^3+S(i+1)+N(i+1)$$

$$x(i+1)=x(i)+(k_1+2k_2+2k_3+k_4)h/6$$

where x(i), S(i) and N(i) represent discrete forms of the signals x(t), S(t) and N(t), respectively, and h represents a calculation step.

(5-4) An output x(i) of the stochastic resonance system is evaluated by using a signal-to-noise ratio index SNR as follows:

$$SNR = 10\log_{10}\frac{P_{signal}}{P_{noise}} = 10\log_{10}\frac{P\left(\text{round}\left(\frac{f_m}{\Delta f}\right)+1\right)}{\sum_{j=1}^{Num}P(j) - P\left(\text{round}\left(\frac{f_m}{\Delta f}\right)+1\right)},$$

where $P(\cdot)$ represents a power spectrum of the signal x(i), $\Delta f=f/N$ is a spectrum resolution, $f_m$ is a target frequency component, namely, a rotating frequency, and thus $f_m=f_{roc}$; and round($\cdot$) represents a rounding operator.

(5-5) The determined instantaneous frequency $\omega(t)$ of an input instantaneous frequency signal covers components S(t) and N(t). Therefore, magnitudes of a, b and h needs to be appropriately adjusted to achieve an optimum stochastic resonance effect, as follows:

$$(a^*, b^*, h^*) = \underset{a\in(0,+\infty),b\in(0,+\infty),h\in(0,+\infty)}{\text{argmax}} SNR(a, b, h).$$

The present disclosure uses a particle swarm optimization algorithm to search for an optimum (a*, b*, h*) combination in a parameter space, performs intrawave modulation characteristic anti-noise enhancement on an input instantaneous frequency $\omega(t)$ via the optimum stochastic resonance system under the parameter combination, and outputs to obtain $\omega_0^*(t)$.

Sub-step (5-5) includes the following sub-sub-steps:

(5-5-1) The estimated instantaneous frequency $\omega(t)$ is input into the stochastic resonance system, $S(t)+N(t)=\omega(t)$ is made, the particle swarm size $N_p=50$ is initialized, the number of dimensions of a parameter search space is set to be 3, a higher bound and a lower bound of searching with respect to the parameters (a, b, h) are set to be LB=[0,0,0] and HB=[0.05, 5000, 0.05], respectively, an inertia weight of a particle is set to be w=0.6, acceleration constants are set to be $\gamma_1=\gamma_2=1.5$, and an absolute value of a maximum particle motion velocity is less than 0.8; and an iteration count IterPSO=0 is initialized, a maximum iteration number MaxIterPSO=500 is set, and a precision coefficient for controlling an iteration process is set to be $\varepsilon_P=0.001$.

(5-5-2) The particles are randomly initialized, and parameters of these particles are substituted into the stochastic resonance system to calculate a corresponding output, respectively; and the current global best output $\omega_0^*(t)$ and its $SNR_0$ are found.

(5-5-3) Loop is started, IterPSO=IterPSO+1 is set, a position and velocity of each particle are updated and adjusted, and parameters of these particles are re-substituted into the stochastic resonance system to calculate the corresponding output, respectively; and the current global best output $\omega_{IterPSO}^*(t)$ and its $SNR_{IterPSO}$ are found.

(5-5-4) A signal-to-noise ratio variation degree $\Delta SNR=|SNR_0-SNR_{IterPSO}|$ is calculated, and $SNR_0=\max(SNR_0,SNR_{IterPSO})$ and $$\omega_0^*(t) = \underset{\omega_i^*(t), i=1,2}{\operatorname{argmax}} (SNR_0, SNR_{IterPSO})$$

are updated.

(5-5-5) If IterPSO>MaxIterPSO or $\Delta SNR<\varepsilon_P$, the loop is broken and $\omega_0^*(t)$ is outputted; else, sub-sub-step (5-5-3) is performed.

(5-5-6) The loop is ended, and a final output result $\omega_0^*(t)$ for performing the anti-noise enhancement of the intrawave frequency modulation characteristics on the input instantaneous frequency $\omega(t)$ based on the optimum stochastic resonance system under the optimal ($a^*$, $b^*$, $h^*$) combination is outputted.

Step 6: processing fast Fourier transform on the instantaneous frequency of the intrawave frequency modulation characteristics after anti-noise enhancement, and diagnosing and identifying a rotor rub-impact fault of the rotating machinery based on a distribution characteristic of harmonic amplitudes related to a rotor rotating frequency.

In step 6, when the distribution characteristic of the harmonic amplitudes related to the rotor rotating frequency $f_{roc}$ on the Fourier spectrum of the instantaneous frequency $\omega_0^*(t)$ satisfies the following two conditions, it is able to be determined that a rotor of the rotating machinery has a rub-impact fault: (1) sharp rotor rotating frequency $f_{roc}$ and its harmonics that can be clearly distinguished from noise and other mechanical vibration components exist; and (2) an amplitude of the fundamental rotating frequency $f_{roc}$ is the maximum.

When the distribution characteristic of the harmonic amplitudes related to the rotor rotation frequency $f_{roc}$ on the Fourier spectrum of the instantaneous frequency $\omega_0^*(t)$ are determined based on judgment logic, preset values, symbol relationships and other conditions to satisfy the two conditions for the existence of the rotor rub-impact fault, the main control unit issues a warning to an operator, indicating that the rotor system of the target rotating machinery may have a rub-impact fault. The operator promptly conducts a shutdown inspection of the target rotating machinery based on the warning, and can effectively manage and rectify the rotor rubbing fault by adjusting the air gap between the stator and rotor, replacing the rotor, and adjusting the operational conditions of the rotating machinery, etc., thereby obtaining a rotating machinery without rotor rub-impact faults, ensuring the safe, stable and efficient operation of the engineering machinery system.

The effects of the method of the present disclosure will be demonstrated below by a specific embodiment.

Figure 2:
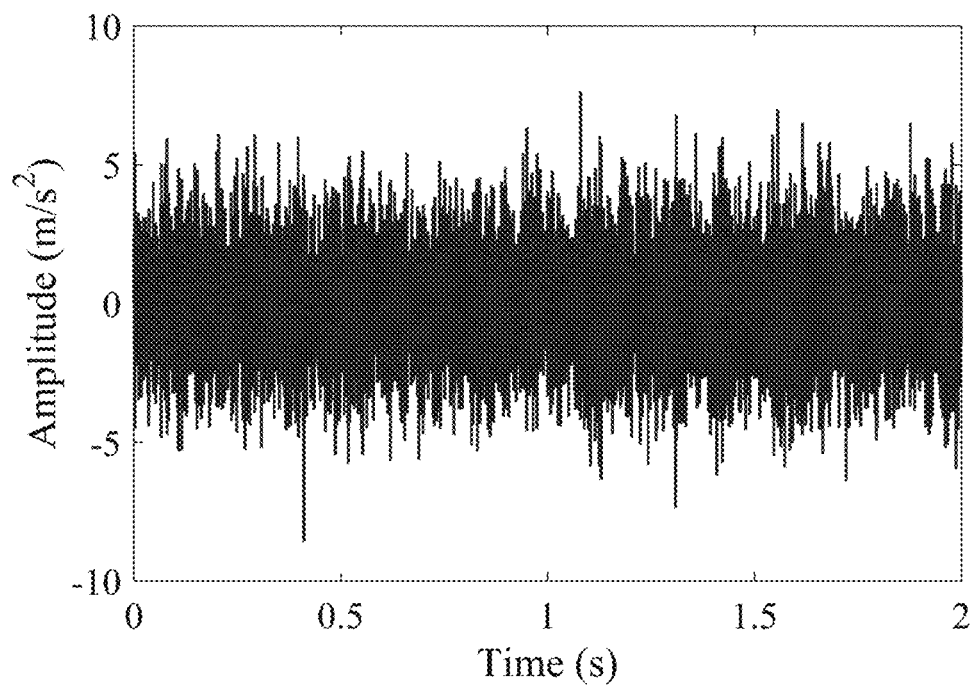
FIG. 2 is a time-domain waveform diagram of a vibratory acceleration signal sequence collected from a centrifugal pump via a vibration acceleration sensor in an embodiment of the present disclosure.

S01, a signal sequence is collected from a centrifugal pump which may have a potential rotor rub-impact fault via a vibration acceleration sensor, and a time-domain waveform of a vibratory acceleration signal is as shown in FIG. 2. The centrifugal pump is operated at a rotational speed of 1500 rpm, so that a rotor rotating frequency $f_{roc}$ thereof can be calculated as 25 Hz, a sampling frequency of the vibration acceleration sensor is 5120 Hz, and a sampling duration is 2 s. From the time-domain waveform of the vibration acceleration signal of FIG. 2, it is difficult to observe the characteristic symptoms associated with the rotor rub-impact fault of the centrifugal pump.

Figure 3:
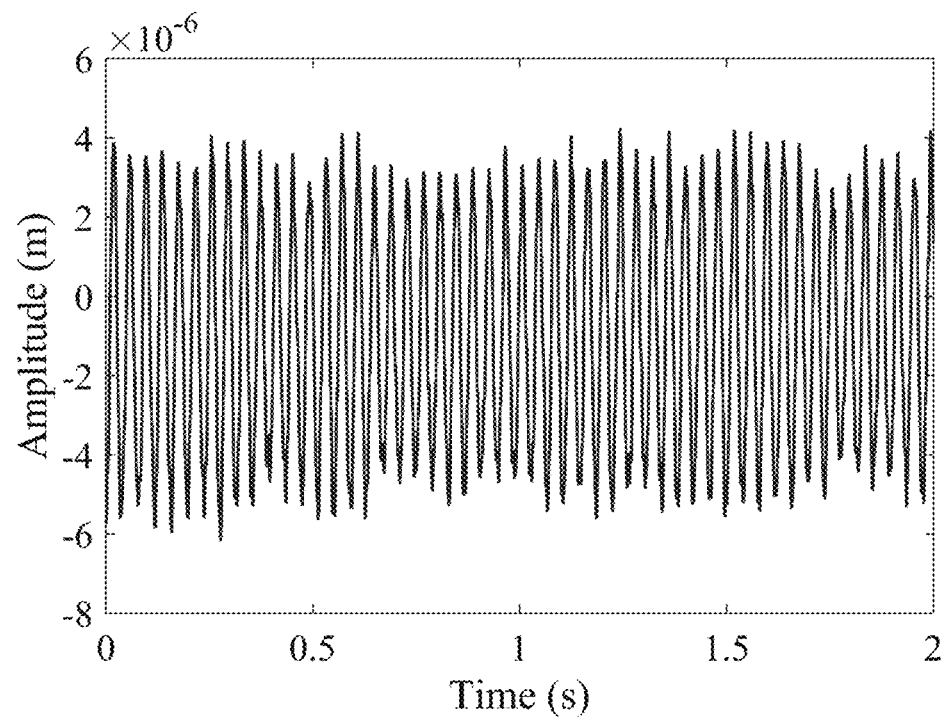
FIG. 3 is a time-domain waveform diagram of a vibratory displacement signal converted from a vibratory acceleration signal via two-stage integration transformation and high-pass filtering in an embodiment of the present disclosure.
Figure 4:
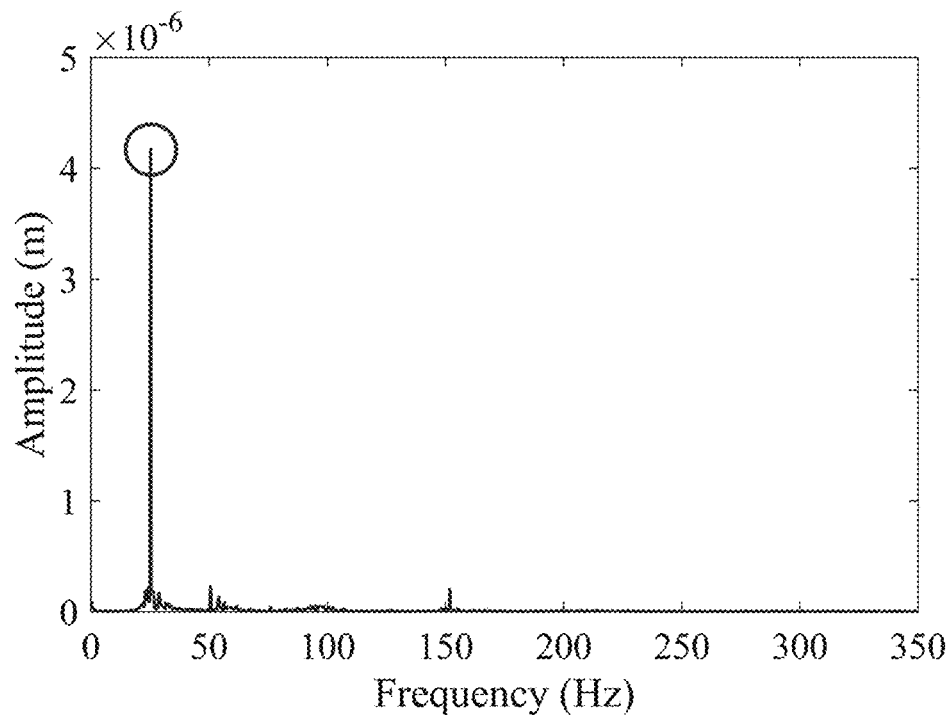
FIG. 4 is a spectrum diagram of a vibratory displacement signal converted from a vibratory acceleration signal via two-stage integration transformation and high-pass filtering in an embodiment of the present disclosure.

S02, based on two-stage integration transformation and high-pass filtering, the collected vibratory acceleration signal is converted into a vibratory displacement signal, wherein cut-off frequencies $W_{BG1}$ and $W_{BG2}$ of a high-pass filter are set to be 24 Hz in the two high-pass filtering processes, and an obtained time-domain waveform diagram of the converted vibratory displacement signal is as shown in FIG. 3, and a frequency spectrum diagram thereof is as shown in FIG. 4. It can be seen from FIG. 4 that there are other frequency components in addition to the most significant rotating frequency $f_{roc}$ (represented by ○).

Figure 5:
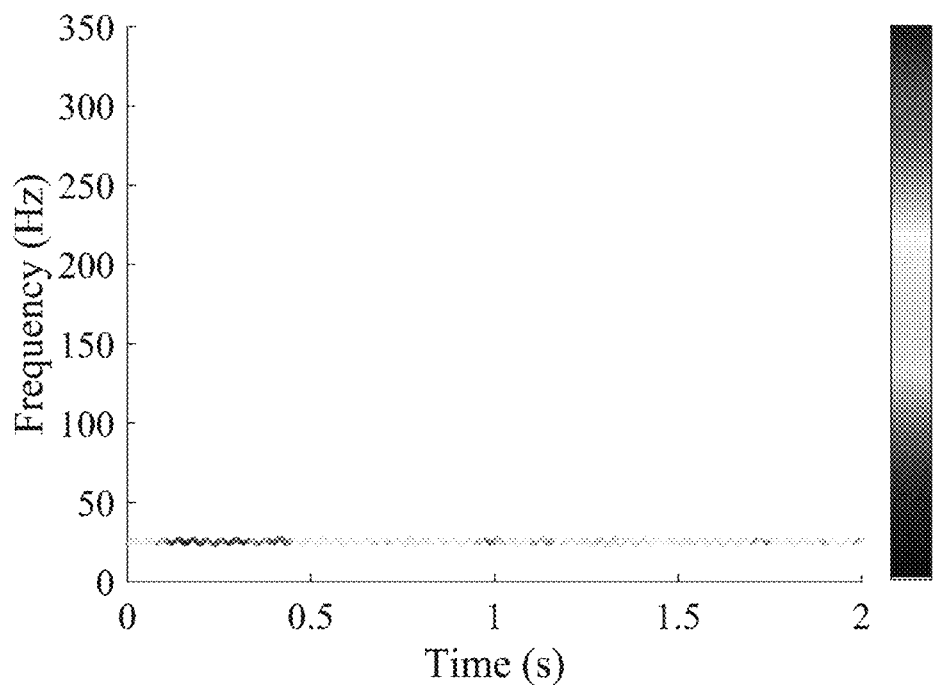
FIG. 5 is a time-frequency diagram of a rotating frequency component in a vibratory displacement signal extracted via an improved variational mode decomposition method in an embodiment of the present disclosure.

S03, targeted extraction is performed on the rotating frequency component in the vibratory displacement signal based on the improved variational mode decomposition method, and instantaneous fluctuation characteristics (i.e. frequency modulation characteristics) of its fundamental frequency are calculated and estimated by using a quadrature-derivative-based normalized Hilbert transform, so as to obtain a time-frequency diagram of the rotating frequency component as shown in FIG. 5. It may be observed that there is an intrawave modulation phenomenon in the rotating frequency of the vibration signal, indicating a potential fault in the rotor of the centrifugal pump, but further clarification is needed on the specific type of fault.

Figure 6:
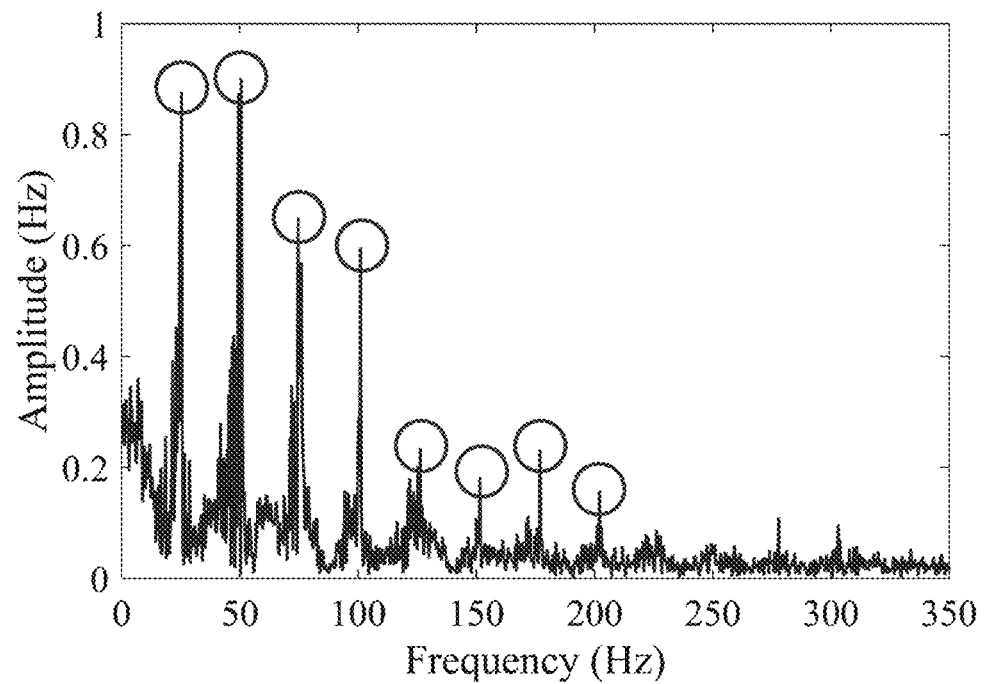
FIG. 6 is a spectrum diagram of an instantaneous frequency of a rotating frequency component estimated using a quadrature-derivative-based normalized Hilbert transform in an embodiment of the present disclosure.

S04, a spectrum diagram of an instantaneous frequency of the rotating frequency component estimated using the quadrature-derivative-based normalized Hilbert transform is drawn, as shown in FIG. 6. It can be seen that due to the interference of noise and other complex factors, distribution characteristics of harmonic amplitudes related to the rotor rotating frequency $f_{roc}$ on a Fourier spectrum of the instantaneous frequency cannot meet the criteria for determining the rotor rub-impact fault. Therefore, it is still difficult to determine whether the centrifugal pump has experienced the rotor rub-impact fault.

Figure 7:
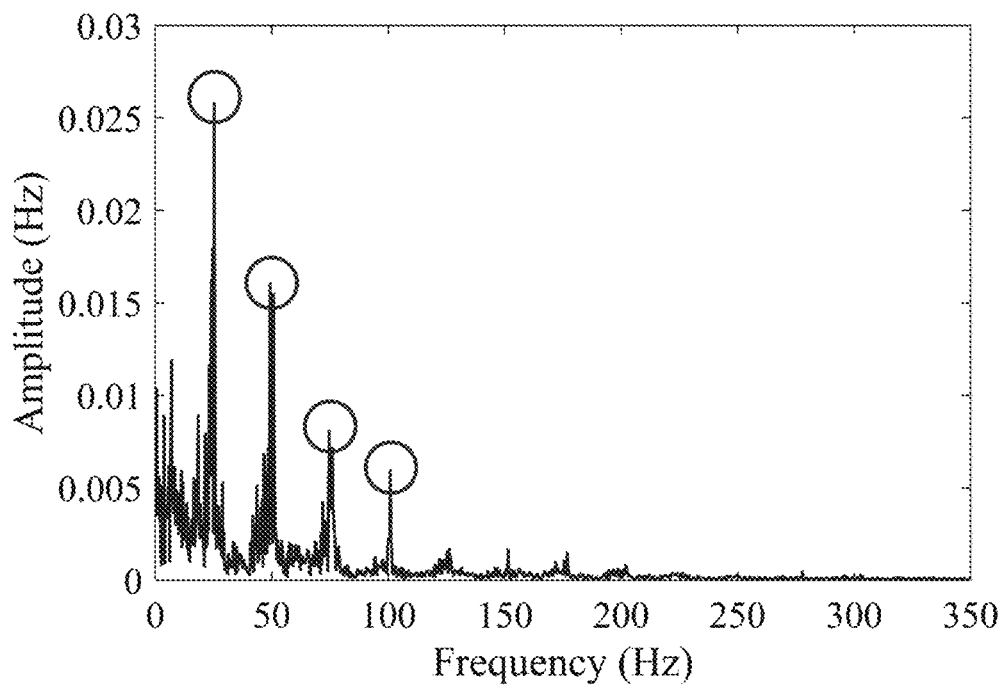
FIG. 7 is a spectrum diagram of an instantaneous frequency with frequency modulation characteristic enhancement outputted by an optimum stochastic resonance system in an embodiment of the present disclosure.

S05, intrawave modulation characteristic anti-noise enhancement is performed by inputting an instantaneous frequency sequence obtained through calculation into an optimum stochastic resonance system, wherein potential energy parameters of the stochastic resonance system and a step length of a Runge-Kutta calculation process are optimized by a particle swarm optimization algorithm, and an optimal ($a^*$, $b^*$, $h^*$) parameter combination obtained through algorithm optimization is ($2.9 \times 10^{-4}$, $4.4 \times 10^3$, $0.0015$). The spectrum of the instantaneous frequency $\omega_0^*(t)$ subjected to the frequency modulation characteristic enhancement and outputted by the optimum stochastic resonance system is as shown in FIG. 7, sharp rotor rotating frequency $f_{roc}$ and its harmonics that can be clearly distinguished from noise and other mechanical vibration components exist, and an amplitude of first rotating frequency $f_{roc}$ is the largest. From this, it can be determined that the centrifugal pump experienced the rotor rub-impact fault during operation. The main control unit issued a warning to the operator, indicating potential rub-impact faults in the rotor system of the centrifugal pump. Based on this warning, the operator conducts a shutdown inspection of the centrifugal pump, and can take measures such as adjusting the stator-rotor gap, replacing the rotor, and adjusting the operating conditions of the rotating machinery to address the rub-impact faults. As a result, the centrifugal pump is restored to a condition without rotor rub-impact issues.

Figure 8A:
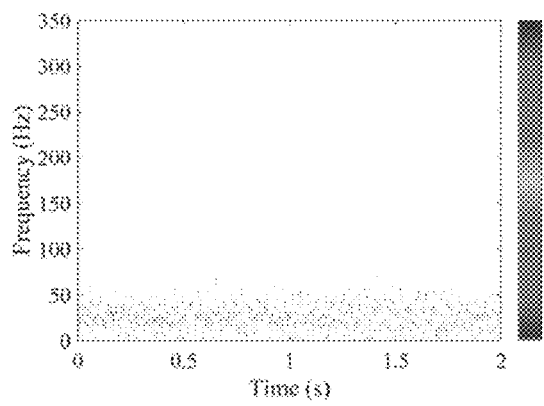
FIGS. 8(a)-8(c) show the analysis results of HHT and ACMD, where
Figure 8B:
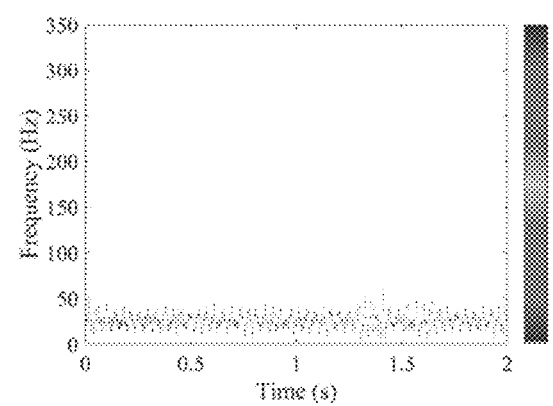
Figure 8C:
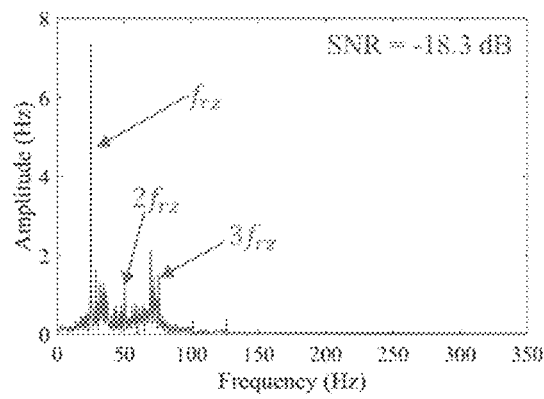

FIGS. 8(a)-8(c) show the analysis results of HHT and ACMD, which are the prior art. For HHT, due to its inherent deficiencies of mode mixing, recursive sifting, and misclassification caused by fixed band allocation, it is still unable to seize the rapid fluctuating intermediate frequency modal of the target frequency component in this case, and the restricted frequency range time-frequency representation (TFR) of HHT severely suffers from energy diffusion that can smear the manifestation. For ACMD, the weighting coefficient is selected as $1 \times 10^{-6}$ and the smooth parameter is selected as 1×10⁴, and the revealed target IF pattern demonstrated in FIG. 8(b) registers as excessive amplitude of intrawave frequency modulation and a certain degree of energy diffusion. Even so, in FIG. 8(c), the rotating frequency and its harmonics can be observed and the rotor rubbing failure can be diagnosed through this result. Here, the harmonic components in the ACMD result are very damaged by the interference component, which is visually inferior to the result obtained by the proposed method. As a consequence, the overall performance of the method of the present disclosure in intrawave frequency modulation characteristic detection for structural rotor rub-impact detection and diagnostics is generally more robust and superior to the HHT and ACMD methods.

Those ordinarily skilled in the art may understand that the above is only the preferred embodiments of the present disclosure and is not configured to limit the present disclosure. Although the present disclosure is illustrated in detail referring to the aforementioned embodiments, those skilled in the art may still modify the technical solutions recorded in all the aforementioned embodiments, or perform equivalent replacement on part of technical features therein. Modifications, equivalent replacements, improvements and the like made within the spirit and scope of the present disclosure shall all be contained in the scope of protection of the present disclosure.

What is claimed is:

1. A method for diagnosing rotor rub-impact in a rotating machinery based on vibration signal deconstruction and frequency modulation characteristic anti-noise enhancement comprising the following steps:
   step 1: collecting, by a vibration acceleration sensor, a signal sequence from a rotating machinery device;
   step 2: converting, based on two-stage integration transformation and high-pass filtering, a collected vibratory acceleration signal into a vibratory displacement signal;
   step 3: performing targeted extraction on a rotating frequency component in the vibratory displacement signal based on an improved variational mode decomposition method;
   step 4: calculating and estimating instantaneous fluctuation characteristics of a fundamental frequency of the extracted rotating frequency component using a quadrature-derivative-based normalized Hilbert transform to obtain an instantaneous frequency;
   step 5: inputting a calculated instantaneous frequency sequence into an optimum stochastic resonance system for anti-noise enhancement of intrawave frequency modulation characteristics, wherein potential energy parameters of a stochastic resonance system and a step length of a Runge-Kutta calculation process are optimized by a particle swarm optimization algorithm to obtain the optimum stochastic resonance system; and
   step 6: processing fast Fourier transform on the instantaneous frequency of the intrawave frequency modulation characteristics after anti-noise enhancement, diagnosing and identifying a rotor rub-impact fault of the rotating machinery based on a distribution characteristic of harmonic amplitudes related to a rotor rotating frequency, issuing, by a main control unit, a warning to an operator, and promptly conducting, by the operator, a shutdown inspection and a maintenance of the target rotating machinery, to obtain the rotating machinery without the rotor rub-impact fault.

2. The method for diagnosing rotor rub-impact in the rotating machinery based on the vibration signal deconstruction and the frequency modulation characteristic anti-noise enhancement according to claim 1, wherein in the step 1, the signal sequence collected from the rotating machinery device by the vibration acceleration sensor is recorded as $S_{a_o}(i)$, i=1, 2, 3, . . . , N, where N represent a number of total sampling points, and a sampling frequency is recorded as $f_s$; and in a signal collecting process, a frequency response parameter of the used vibration acceleration sensor is not less than 2 kHz, a sampling frequency of a vibration signal sequence is not less than 5.12 kHz and not greater than 100 kHz, and a sampling duration is not less than 1 s.

3. The method for diagnosing rotor rub-impact in the rotating machinery based on the vibration signal deconstruction and the frequency modulation characteristic anti-noise enhancement according to claim 1, wherein the step 2 comprises the following sub-steps:
   sub-step (2-1), performing one integration to convert the vibratory acceleration signal $S_{a_o}$ into a vibratory velocity signal as follows:

$S_{v_o}(1)=0$, $S_{v_o}(i)=S_{v_o}(i-1)+S_a(i-1)\times\Delta T, i=2,3,\ldots,N+1$, where $\Delta T=1/f_s$, $S_a$ is obtained by filtering a signal $S_{a_o}$ through a high-pass filter, and a cut-off frequency $W_{BG1}$ of the high-pass filter is taken from 10 Hz to 25 Hz; and
   sub-step (2-2), removing, by a high-pass filter, an extremely low-frequency component of the obtained vibratory velocity signal $S_{v_o}$, and taking a cut-off frequency $W_{BG2}$ of the high-pass filter from 10 Hz to 25 Hz, to obtain a filtered signal $S_v$; and performing an integration operation on $S_v$ to obtain a final vibratory displacement signal $S_x$:

$S_x(1)=(S_v(1)+S_v(2))/2\times\Delta T$, $S_x(i)=S_x(i-1)+(S_v(i)+S_v(i+1))/2\times\Delta T, i=2,3,\ldots,N$;

wherein a high-pass filter with a stopband attenuation of 60 dB is used to perform zero-phase filtering on the vibratory acceleration signal and the vibratory velocity signal, respectively, in the step 2, and the high-pass filter attenuates a frequency lower than a specified passband frequency, and the attenuated frequency is capable of compensating for a delay introduced by a digital filter.

4. The method for diagnosing rotor rub-impact in the rotating machinery based on the vibration signal deconstruction and the frequency modulation characteristic anti-noise enhancement according to claim 1, wherein the step 3 comprises the following sub-steps:
   sub-step (3-1), defining a series of intrinsic mode functions $u_k(t)$, $k\in(1, 2, \ldots, K)$, with K being the total number of modes, with respect to the signal $S_x$ as a series of amplitude modulation-frequency modulation signals with a limited bandwidth, expressed as:

$u_k(t)=A_k(t)\cos(\varphi_k(t))$ where $A_k(t)$ and $\varphi_k(t)$ represent an instantaneous amplitude and an instantaneous phase, respectively, and $\varphi_k(t)$ is a nondecreasing function, that is, the instantaneous frequency satisfies $\omega_k(t)=d[\varphi_k(t)]/dt\geq 0$;
   a variational method is expressed as:

$$BW_k = \left\|\partial_t\left[\left(\delta(t)+\frac{j}{\pi t}\right)*u_k(t)\right]e^{-j\omega_k t}\right\|_2,$$

where $\delta(\cdot)$ represent a Dirac function, and * is a convolution manipulator; and $BW_k$ is a norm of a bandwidth of $u_k(t)$ in a frequency domain;

a constrained variational problem is remodeled as:

$$\min_{\{u_k\},\{\omega_k\}} \left\{ \sum_{k=1}^{K} \left\| \partial_t \left[ \left(\delta(t) + \frac{j}{\pi t}\right) * u_k(t) \right] e^{-j\omega_k t} \right\|_2^2 \right\}$$

subject to $\sum_{k=1}^{K} u_k(t) = S_x(t),$ where $\omega_k$ represents a center frequency of K intrinsic mode functions, $k \in (1, 2, \ldots, K)$;

sub-step (3-2), introducing a quadratic penalty term and a Lagrangian multiplier term to address the constrained variational problem, as follows:

$$L(\{u_k\}, \{\omega_k\}, \lambda) = \alpha \sum_{k=1}^{K} \left\| \partial_t \left[ \left(\delta(t) + \frac{j}{\pi t}\right) * u_k(t) \right] e^{-j\omega_k t} \right\|_2^2 + \left\| S_x(t) - \sum_{k=1}^{K} u_k(t) \right\|_2^2 + \langle \lambda(t), S_x(t) - \sum_{k=1}^{K} u_k(t) \rangle,$$

where $\alpha$ represents a bandwidth balance parameter, and $\lambda(t)$ is a Lagrangian multiplier coefficient; the equation is resolved via an alternate direction Lagrangian multiplier method, so as to obtain K intrinsic mode functions $u_k(t)$, $k \in (1, 2, \ldots, K)$ with respect to the vibratory displacement signal $S_x(t)$; and sub-step (3-3), extracting the rotating frequency component in the vibratory displacement signal $S_x$ based on the improved variational mode decomposition method, that is, before performing a variational mode decomposition and an intrinsic mode function extraction on the vibratory displacement signal $S_x$, setting a mode number K to be 1, setting an initial bandwidth balance parameter $\alpha$ to be 5000, setting an initial central frequency of a mode to be a rotating frequency $f_{roc}$, and evaluating a spectrum definition of a signal deconstruction result using a target frequency index MTFI, wherein an optimal parameter of a deconstruction algorithm is obtained by performing optimization via forward and reverse alternate iterations;

the target frequency index MTFI is expressed as follows:

$$MTFI = \frac{F^*(f_{roc})}{\sum_{f_j} F(f_j)},$$

$$F^*(f_{roc}) = \max[F(f_{roc} - 0.02 f_{roc}, f_{roc} + 0.02 f_{roc})],$$

where $F(f_j)$ represents a Fourier spectrum amplitude of an output signal at a frequency $f_j$; and $F^*(f_{roc})$ represents a maximum frequency amplitude within a range of 22% values around the rotating frequency $f_{roc}$; and obtaining an intrinsic mode function $u_{target}$ corresponding to the maximum MTFI value as the extracted rotating frequency component.

5. The method for diagnosing rotor rub-impact in the rotating machinery based on the vibration signal deconstruction and the frequency modulation characteristic anti-noise enhancement according to claim 4, wherein the sub-step (3-3) comprises the following sub-sub-steps:

sub-sub-step (3-3-1), inputting a vibratory displacement signal $S_x$, initializing an iteration count Iter=0, setting the maximum iteration number MaxIter=500, and setting a searching step of the bandwidth balance parameter to be $\Delta\alpha=500$;

sub-sub-step (3-3-2), performing a primary deconstruction on the vibratory displacement signal $S_x$ using the variational mode decomposition to obtain an intrinsic mode function $u_0$ and a target frequency index $MTFI_0$;

sub-sub-step (3-3-3), starting loop, setting Iter=Iter+1, and changing the bandwidth balance parameter into $\alpha_1=\alpha_0+\Delta\alpha$ and $\alpha_2=\alpha_0-\Delta\alpha$, respectively; and substituting two obtained values $\alpha_1$ and $\alpha_2$ of the bandwidth balance parameter into a variational mode decomposition algorithm, respectively, to perform a deconstruction on the vibratory displacement signal $S_x$, to obtain $u_{1,Iter}$ and $u_{2,Iter}$ as well as a corresponding $MTFI_{1,Iter}$ and $MTFI_{2,Iter}$, respectively;

sub-sub-step (3-3-4), breaking the loop and outputting a final target rotating frequency-related component $u_{target}=u_0$ when $MTFI_0>MTFI_{1,Iter}$ and $MTFI_0>MTFI_{2,Iter}$; and updating $MTFI_0=\max(MTFI_{1,Iter}, MTFI_{2,Iter})$ and $$\alpha_0 = \operatorname*{argmax}_{\alpha_i, i=1,2}(MTFI_{i,Iter})$$

when $MTFI_0$ does not satisfy that $MTFI_0>MTFI_{1,Iter}$ and $MTFI_0>MTFI_{2,Iter}$;

sub-sub-step (3-3-5), when Iter>MaxIter, breaking the loop and outputting a result $u_{target}$ obtained using the improved variational mode decomposition method to deconstruct the vibratory displacement signal $S_x$ under an action of the latest bandwidth balance parameter $\alpha_0$; else, going back to the sub-sub-step (3-3-3); and sub-sub-step (3-3-6), ending the loop and outputting a target rotating frequency component $u_{target}$.

6. The method for diagnosing rotor rub-impact in the rotating machinery based on the vibration signal deconstruction and the frequency modulation characteristic anti-noise enhancement according to claim 5, wherein in the sub-sub-steps (3-3-2), (3-3-3) and (3-3-5), said using the improved variational mode decomposition method to deconstruct the vibratory displacement signal $S_x$ comprises the following sub-steps:

sub-step (i), setting the Fourier transform of $u_k(t)$, f(t) and $\lambda(t)$ as $\hat{u}_k(\omega)$, $\hat{f}(\omega)$ and $\hat{\lambda}(\omega)$, respectively; and initializing $\{\hat{u}_k^1\}$, $\{\omega_1^k\}$ and $\hat{\lambda}^1$, iteratively counting n=0;

sub-step (ii), iteratively counting n=n+1;

sub-step (iii), updating, for k=1, 2, ..., K, all $\hat{u}_k$ one by one, expressed as follows:

$$\hat{u}_k^{n+1}(\omega) \leftarrow \frac{\hat{f}(\omega) - \sum_{k<k} \hat{u}_i^{n+1}(\omega) - \sum_{k>k} \hat{u}_i^n(\omega) + \hat{\lambda}^n(\omega)/2}{1 + 2\alpha(\omega - \omega_k^n)^2},$$

updating $\omega_k$ simultaneously as follows:

$$\omega_k^{n+1} \leftarrow \frac{\int_0^\infty \omega |\hat{u}_k^{n+1}(\omega)|^2 d\omega}{\int_0^\infty |\hat{u}_k^{n+1}(\omega)|^2 d\omega},$$

sub-step (iv), updating $\hat{\lambda}(\omega)$ as follows:

$$\hat{\lambda}^{n+1}(\omega) \leftarrow \hat{\lambda}^n(\omega) + \tau(\hat{f}(\omega) - \Sigma_k \hat{u}_k^{n+1}(\omega)),$$

where τ is a noise tolerance coefficient, τ=0, and is used to regulate and control an influence of noise during deconstruction; and sub-step (v), repeating the sub-steps (ii)-(iv) until an ending condition is satisfied as follows:

$$\Sigma_k \|\hat{u}_k^{n+1} - \hat{u}_k^n\|_2^2 / \|\hat{u}_k^n\|_2^2 < \varepsilon$$

where ε represents a convergence coefficient, and =1×10⁻⁶.

7. The method for diagnosing rotor rub-impact in the rotating machinery based on the vibration signal deconstruction and the frequency modulation characteristic anti-noise enhancement according to claim 1, wherein the step 4 comprises the following sub-steps:

sub-step (4-1), seeking out, for a monocomponent amplitude modulation-frequency modulation signal g(t), all maximum extreme values in an absolute form when am amplitude of the signal g(t) is not normalized, and performing cubic spline function fitting on these extreme values to obtain an empirical envelope function $B_0(t)$;

sub-step (4-2), performing amplitude normalization on the signal g(t), namely:

$$g_1(t) = g(t)/B_0(t),$$

repeating the sub-step (4-1) when the amplitude of the signal $g_1(t)$ is still not completely normalized, until difference between the amplitude of Lth empirical envelope function and 1 is smaller than $10^5$, and considering the obtained output signal $g_{L+1}(t)$ as a pure frequency modulation signal;

sub-step (4-3), calculating an instantaneous amplitude signal $B(t)=B_0(t) \cdot B_1(t) \cdot \ldots \cdot B_L(t)$ of the signal g(t), and recalculating a frequency modulation signal F(t) of the signal g(t):

$$F(t) = g(t)/B(t), \text{ and}$$

sub-step (4-4), letting $Q(t) = \pm \sqrt{1-F^2(t)}$, so that an instantaneous phase φ(t) is defined as:

$$\phi(t) = \arctan[Q(t)/F(t)],$$

calculating and estimating an instantaneous frequency ω(t) as:

$$\omega(t) = \frac{[d\phi(t)/dt]}{2\pi},$$

and satisfying consistently ω(t)>0.

8. The method for diagnosing rotor rub-impact in the rotating machinery based on the vibration signal deconstruction and the frequency modulation characteristic anti-noise enhancement according to claim 1, wherein the step 5 comprises the following sub-steps:

sub-step (5-1), constructing a stochastic resonance system as follows:

$$\frac{dx}{dt} = -\frac{dU(x)}{dx} + S(t) + N(t),$$

where x is a motion trajectory of a point particle, S(t) represents a tenuous periodic signal, N(t) represents Gaussian white noise, and U(x) represents a potential function;

sub-step (5-2), using a reflection-symmetric quartic potential function as U(x):

$$U(x) = -\frac{1}{2}ax^2 + \frac{1}{4}bx^4,$$

where a and b represent positive parameters controlling a potential barrier and a potential well of the reflection-symmetric quartic potential function U(x), respectively; and deriving the stochastic resonance system as follows:

$$\frac{dx}{dt} = ax - bx^3 + S(t) + N(t);$$

sub-step (5-3), resolving the stochastic resonance system based on a fourth-order Runge-Kutta approach to obtain the following equations:

$$k_1 = ax(i) - bx(i)^3 + S(i) + N(i)$$

$$k_2 = a(x(i) + hk_1/2) - b(x(i) + hk_1/2)^3 + S(i) + N(i)$$

$$k_3 = a(x(i) + hk_2/2) - b(x(i) + hk_2/2)^3 + S(i+1) + N(i+1),$$

$$k_4 = a(x(i) + hk_3) - b(x(i) + hk_3)^3 + S(i+1) + N(i+1)$$

$$x(i+1) = x(i) + (k_1 + 2k_2 + 2k_3 + k_4)h/6$$

where x(i), S(i) and N(i) represent discrete forms of the signals x(t), S(t) and N(t), respectively, and h represents a calculation step;

sub-step (5-4), evaluating an output x(i) of the stochastic resonance system using a signal-to-noise ratio index SNR as follows:

$$SNR = 10\log_{10}\frac{P_{signal}}{P_{noise}} = 10\log_{10}\frac{P\left(\text{round}\left(\frac{fm}{\Delta f}\right)+1\right)}{\sum_{j=1}^{Num} P(j) - P\left(\text{round}\left(\frac{fm}{\Delta f}\right)+1\right)},$$

where P(•) represents a power spectrum of the signal x(i), $\Delta f = f_s/N$ represents a spectrum resolution, $f_m$ represents a target frequency component, namely, a rotating frequency, and thus $f_m = f_{roc}$; and round(•) represents a rounding operator; and sub-step (5-5), searching for an optimum (a*, b*, h*) combination in a parameter space using a particle swarm optimization algorithm, performing the anti-noise enhancement of the intrawave frequency modulation characteristics on an input instantaneous frequency ω(t) based on the optimum stochastic resonance system under the (a*, b*, h*) combination, and outputting $\omega_0^*(t)$.

9. The method for diagnosing rotor rub-impact in the rotating machinery based on the vibration signal deconstruction and the frequency modulation characteristic anti-noise enhancement according to claim 8, wherein the sub-step (5-5) comprises the following sub-sub-steps:

sub-sub-step (5-5-1), inputting the estimated instantaneous frequency ω(t) into the stochastic resonance system, letting S(t)+N(t)=ω(t), initializing a particle swarm size $N_p=50$, setting dimensions of a parameter search space to be 3, setting a higher bound and a lower bound of searching with respect to the parameters (a, b, h) to be LB=[0,0,0] and HB=[0.05, 5000, 0.05], respectively, setting an inertia weight of a particles to be w=0.6, setting acceleration constants to be $\gamma_1=\gamma_2=1.5$, and an absolute value of a maximum particle motion velocity being less than 0.8; and initializing an iteration number IterPSO=0, setting a maximum iteration number MaxIterPSO=500, and setting a precision coefficient for controlling an iteration process to be $\varepsilon_P=0.001$;

sub-sub-step (5-5-2), randomly initializing the particles, and substituting parameters of these particles into the stochastic resonance system to calculate a corresponding output; and finding a current global best output $\omega_0^*(t)$ and $SNR_0$;

sub-sub-step (5-5-3), starting loop, setting IterPSO=IterPSO+1, updating and modifying a position and velocity of each particle, and re-substituting parameters of the particles into the stochastic resonance system to calculate the corresponding output, respectively; and finding a current global best output $\omega_{IterPSO}^*(t)$ and $SNR_{IterPSO}$;

sub-sub-step (5-5-4), calculating a signal-to-noise ratio variation degree $\Delta SNR=|SNR_0-SNR_{IterPSO}|$, and updating $SNR_0=\max(SNR_0, SNR_{IterPSO})$ and $$\omega_0^*(t) = \underset{\omega_i^*(t), i=1,2}{\mathrm{argmax}} (SNR_0, SNR_{IterPSO});$$

sub-sub-step (5-5-5), breaking the loop and outputting $\omega_0^*(t)$ when IterPSO>MaxIterPSO or $\Delta SNR<\varepsilon_P$; else, going back to the sub-sub-step (5-5-3); and sub-sub-step (5-5-6), ending the loop, and outputting a final output result $\omega_0^*(t)$ of performing the anti-noise enhancement of the intrawave frequency modulation characteristics on the input instantaneous frequency $\omega(t)$ based on the optimum stochastic resonance system under the optimal (a*, b*, h*) combination.

10. The method for diagnosing rotor rub-impact in the rotating machinery based on the vibration signal deconstruction and the frequency modulation characteristic anti-noise enhancement according to claim 1, wherein in the step 6, determining that the rotor rub-impact fault of the rotating machinery exists when the distribution characteristic of the harmonic amplitudes related to the rotor rotating frequency $f_{roc}$ on the Fourier spectrum of the instantaneous frequency $\omega_0^*(t)$ satisfies following two conditions:

a sharp rotor rotating frequency $f_{roc}$ and harmonics of the sharp rotor rotating frequency $f_{roc}$ exist, wherein the sharp rotor rotating frequency $f_{roc}$ and the harmonics of the sharp rotor rotating frequency $f_{roc}$ are capable of being clearly distinguished from noise and other mechanical vibration components; and an amplitude of the fundamental rotating frequency $f_{roc}$ is the maximum.

\* \* \* \* \*